June 11, 1940.  R. C. STEENHOLDT  2,204,387

BATTERY TERMINAL QUICK ACTION CLIP

Filed Nov. 25, 1939

Inventor
Raymond C. Steenholdt

By Carl Miller
Attorney

Patented June 11, 1940

2,204,387

UNITED STATES PATENT OFFICE 2,204,387

BATTERY TERMINAL QUICK ACTION CLIP

Raymond C. Steenholdt, Canton, S. Dak.

Application November 25, 1939, Serial No. 306,090

2 Claims. (Cl. 173—259)

This invention relates to a battery terminal connector and has for its object to provide in a manner as hereinafter set forth, a device of the class referred to for insuring a firm contact with respect to the battery post without the use of bolts or screws and for reducing to a minimum the possibility of the connector becoming loose with respect to the post and further to set up a battery connection which can be more readily or easily manufactured than the present type of battery terminal connection now generally used.

The invention broadly contemplates the provision of a split sleeve which is permanently attached to a cable and adapted to frictionally receive a battery terminal post and a clip member designed to be oscillatably mounted on the sleeve and forced into frictional engagement therewith to compress the same into gripping relation with the battery post.

With the foregoing and other objects in view, the invention consists of the novel construction, combination and arrangement of parts as hereinafter more specifically described, and illustrated in the accompanying drawing wherein is shown an embodiment of the invention, but it is to be understood that changes, variations and modifications can be resorted to which fall within the scope of the claims hereunto appended.

In the drawing wherein like reference characters denote corresponding parts throughout the several views.

Figure 1:
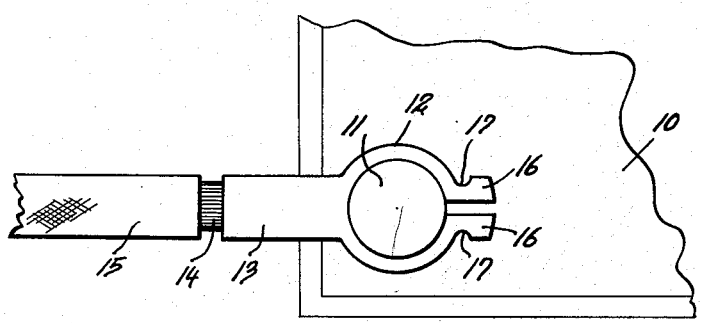
Figure 1 is a plan view of a cable terminal in position on a battery terminal post.

Referring to the drawing, 10 denotes a battery and 11 a terminal post thereof. A split sleeve 12 is formed to provide a hollow shank 13 which is adapted to receive the end portion 14 of a cable 15 which latter is suitably secured within the shank as by soldering or any other suitable means in the manner well known. At the split portion of the sleeve 12, there is provided a pair of opposed clamping extensions 16 each provided on its outer face with a groove 17 for a purpose to be hereinafter described.

Figure 2:
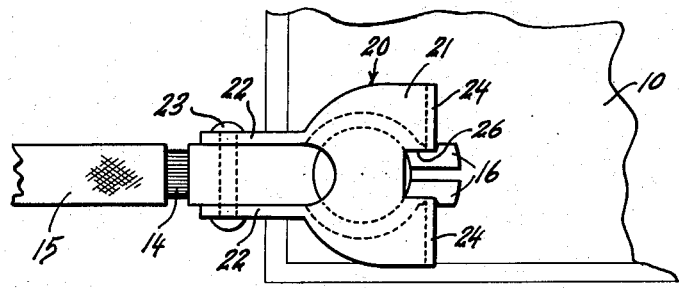
Figure 2 is a plan view showing clip mounted on cable terminal as attached to the battery terminal post.

Co-acting with the sleeve 12 is a clip member 20 formed as a unitary stamping of heavy gauge sheet metal and comprising a top 21 provided at one end with a pair of parallel rearwardly and downwardly extending arms 22 spaced apart a distance equal to the diameter of the shank 13. The arms 22 are adapted to straddle the shank 13 and are hingedly connected thereto by a pin or rivet 23 passing through the end portions of said arms and transversely through said shank as clearly shown in Figure 2. Integral with the other or forward end of the top 21 are a pair of depending jaws 24 having their inner edges curved as at 25, the jaws 24 being normal to the plane of the top 21. The innner edges 25 are spaced apart a distance such as to be adapted to seat in the grooves 17 of the clamping jaws 16. The top 21 is provided with a recessed or cutaway portion 26 such as to leave exposed a portion of the upper surface of the clamping jaws 16, sleeve 12 and battery terminal post 11.

Figure 3:
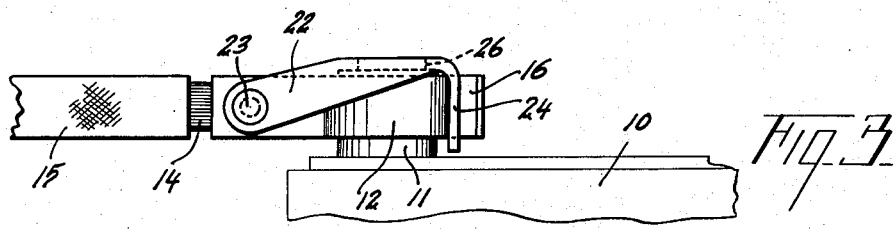
Figure 3 is a side elevational view of showing in Figure 2.
Figure 4:
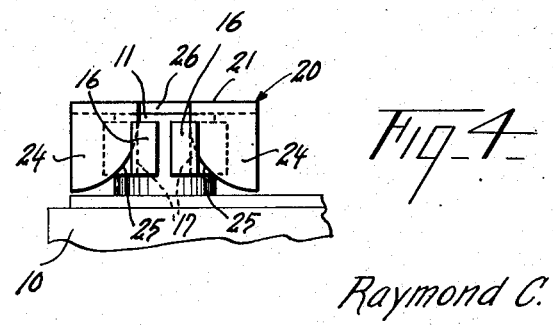
Figure 4 is a front elevational view of showing in Figure 2.

Thus with the clip 20 hingedly attached to the terminal sleeve 12 of the cable and with the clip 20 in a raised position, the cable is attached to the terminal post 11 by first placing the sleeve 12 thereon as shown in Figure 1, and then bringing the clip down so that the jaws 24 will engage the grooves 17 in the clamping extensions 16. By tapping or striking the top 21 of the clip 20, the jaws 24 will be forced downwardly into the grooves 17 so as to tightly draw the extensions 16 together for securely clamping the sleeve 12 on the terminal post 11, the clip 20 being in its final position when the top 21 thereof engages the top surface of the post 11, see Figures 2 and 3.

From the foregoing, it will be readily apparent that the cable terminal connector herein described may be easily and quickly put into use without the delay incident to the use of bolts or screws and which when it is to be disconnected, it is merely necessary to insert some suitable instrument into the recess 26 beneath the top 21 to pry the clip up out of engagement with the clamping extensions 16, in the manner readily apparent.

Having thus described my invention, I claim as new and desire to secure by Letters Patent:

1. A battery cable terminal connector for connection with a battery terminal post comprising a split sleeve member adapted to encircle said post, a shank on said sleeve member to which said battery cable is fixed, the opposed ends of said sleeve member at the gap thereof being each provided with an extension, said extensions being arranged in opposed parallel relation, a clip comprising a pair of rearwardly extending arms adapted to straddle said shank and hingedly connected thereto, and a pair of laterally spaced depending jaw members provided at the forward end of said clip adapted to co-act in wedging engagement with said sleeve extensions when said clip is moved downwardly with relation to said post for forcing said split sleeve into clamping engagement therewith, said sleeve extensions being each provided with a vertical groove on the outer side thereof and said clip jaw members being each formed with a convexly curved inner edge portion adapted to seat in an adjacent extension groove.

2. A battery cable terminal connector for connection with a battery terminal post comprising a split sleeve member adapted to encircle said post, a shank on said sleeve member to which said battery cable is fixed, the opposed ends of said sleeve member at the gap thereof being each provided with an extension, said extensions being arranged in opposed parallel relation, a clip comprising a pair of rearwardly extending arms adapted to straddle said shank and hingedly connected thereto, and a pair of laterally spaced depending jaw members provided at the forward end of said clip adapted to co-act in wedging engagement with said sleeve extensions when said clip is moved downwardly with relation to said post for forcing said split sleeve into clamping engagement therewith, said clip including a flat top adapted to abut the top of said battery terminal post when in its lowermost position, and a recessed cut-away portion formed in said top between said laterally spaced jaw members for the reception of a tool whereby to pry said clip out of its wedging engagement with said sleeve extensions to effect ready removal of said sleeve off of said post.

RAYMOND C. STEENHOLDT.